(12) United States Patent
Matsuda et al.

(10) Patent No.: US 8,168,082 B2
(45) Date of Patent: May 1, 2012

(54) LIQUID CRYSTALLINE COATING SOLUTION AND POLARIZING FILM

(75) Inventors: Shoichi Matsuda, Ibaraki (JP); Kyoko Nishiguchi, Ibaraki (JP); Tadayuki Kameyama, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 378 days.

(21) Appl. No.: 12/524,444

(22) PCT Filed: Oct. 21, 2008

(86) PCT No.: PCT/JP2008/068994
§ 371 (c)(1),
(2), (4) Date: Jul. 24, 2009

(87) PCT Pub. No.: WO2009/075139
PCT Pub. Date: Jun. 18, 2009

(65) Prior Publication Data
US 2010/0110361 A1    May 6, 2010

(30) Foreign Application Priority Data

Dec. 12, 2007  (JP) ................................. 2007-320542
Mar. 25, 2008  (JP) ................................. 2008-077906

(51) Int. Cl.
*C09K 19/00* (2006.01)
*C09K 19/06* (2006.01)
*C09K 19/32* (2006.01)
*C09K 19/52* (2006.01)

(52) U.S. Cl. ........... 252/299.6; 252/299.01; 252/299.62; 430/20; 428/1.1; 349/1; 349/56; 349/193; 534/573; 534/680

(58) Field of Classification Search ............. 252/299.01, 252/299.6; 430/20; 428/1.1; 349/1, 56, 349/193; 534/573, 680
See application file for complete search history.

(56) References Cited

U.S. PATENT DOCUMENTS 7,811,642 B2 * 10/2010 Peglow et al. ................. 428/1.1

FOREIGN PATENT DOCUMENTS

| EP | 1867684 A1 | 12/2007 |
|---|---|---|
| JP | 2006-323377 A | 11/2006 |
| JP | 2007-126628 A | 5/2007 |
| WO | 2006/107035 A1 | 10/2006 |

OTHER PUBLICATIONS

International Search Report of PCT/JP2008/068994, Mailing Date of Dec. 2, 2008.
P.C. White et al., "High-Performance Liquid Chromatography of Acidic Dyes on a Dynamically Modified Polystyrene-Divinylbenzene Packing Material with Multi-Wavelength Detection and Absorbance Ratio Characterisation", Analyst, 1989, vol. 114, No. 8, p. 877-882.

* cited by examiner

*Primary Examiner* — Geraldina Visconti
(74) *Attorney, Agent, or Firm* — Westerman, Hattori, Daniels & Adrian, LLP

(57) ABSTRACT

A liquid crystalline coating solution which comprises: an azo compound represented by the following general formula (I); and a solvent to dissolve the azo compound:

[Chemical formula 1]

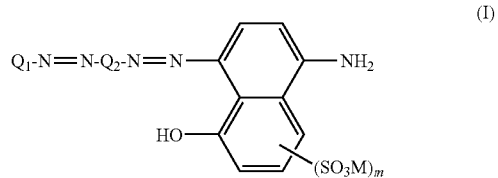

wherein $Q_1$ is a substituted or unsubstituted phenyl group or a substituted or unsubstituted naphthyl group; $Q_2$ is a substituted or unsubstituted phenylene group or a substituted or unsubstituted naphthylene group; m is an integer from 1 to 5; and M is a counter ion.

4 Claims, No Drawings

LIQUID CRYSTALLINE COATING SOLUTION AND POLARIZING FILM

FIELD OF THE INVENTION

The present invention relates to a liquid crystalline coating solution and a polarizing film made from it.

BACKGROUND OF THE INVENTION

In a liquid crystal display (LCD), a polarizing plate is used to control optical rotation of beams that pass through liquid crystals. Conventionally, in such a polarizing plate, a polarizer obtained by dying a resin film, such as a polyvinyl alcohol or the like with iodine or a dichromatic dye and stretching the film in one direction has been widely used. However, there has been a problem that the aforementioned polarizers are poor in heat resistance and light resistance depending on the kind of the dye or the resin film. Moreover, film manufacturing equipment has become bigger as liquid crystal panels become bigger, which has become a problem.

In contrast, a method for forming a polarizing film by coating a coating solution containing a lyotropic liquid crystal compound on a substrate, such as a glass plate or a resin film and the like to orient the lyotropic liquid crystal compound is known. The lyotropic liquid crystal compound forms supramolecular aggregates exhibiting liquid crystallinity in the solution, so that the long axis direction of the supramolecular aggregates is oriented in a flowing direction when flowing after applying shearing stress onto the coating solution containing this. Examples of such lytropic liquid crystal compounds include azo-base compounds (JP 2006-323377 A). Lyotropic liquid crystal compounds based polarizing films do not need to be stretched and are easy to have a greater thickness because of no shrinkage in a width direction by stretching. Further, the lyotropic liquid crystal compounds based polarizing films are expected to have potential because the thickness can be reduced significantly.

To improve quality of the polarizing films, the polarizing film preferably exhibits large absorption dichroism at a wavelength of 520 to 600 nm in the wavelength range having high visibility in which human's eyes feel most strongly. Conventional azo compounds, however, mostly have a maximum absorption wavelength on a long-wavelength side in a visible light region, resulting in a problem of low-quality polarizing films. Thus, a novel azo compound which has resolved this problem has been demanded.

SUMMARY OF THE INVENTION

It is an object of the present invention to provide a liquid crystalline coating solution and a polarizing film exhibiting large absorption dichroism.

Inventors of the present invention carried out extensive investigations to find out what causes a conventional azo compound, for example, an "azo form" compound in the following chemical formula to have a maximum absorption wavelength in the long-wavelength side of the visible light region. As a result, the inventors have found out that the cause lies in that a hydrazone form is formed by a hydroxyl group in an ortho position toward an azo coupling of a naphthalene ring (In the following chemical formula, $Q_1$ is a phenyl group or a naphthyl group as shown in "Hydrazone form" in the following chemical formula (these groups may have any substituent groups) and $Q_2$ is a phenylene group or a naphthalene group (these groups may have any substituent groups)). On the other hand, the azo compound to be used in the present invention does not form a hydrazone form due to no hydrazone group in the ortho position toward an azo bond of the naphthalene ring, so that the azo compound has the maximum absorption wavelength in the wavelength range of 520 to 600 nm with high visibility.

[Chemical formula 6]

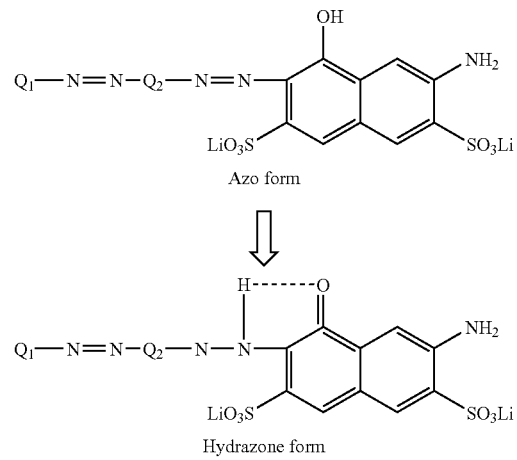

In a first preferred embodiment, a liquid crystalline coating solution according to the present invention comprises: an azo compound represented by the following general formula (I); and a solvent to dissolve the azo compound:

[Chemical formula 1]

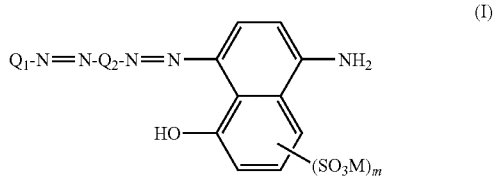

(I)

wherein $Q_1$ is a phenyl group or a naphthyl group (these groups may have any substituent groups); $Q_2$ is a phenylene group or a naphthylene group (these groups may have any substituent groups); m is an integer from 1 to 5; and M is a counter ion.

In a second preferred embodiment of a liquid crystalline coating solution according to the present invention, the azo compound has a concentration of 0.5 to 50% by weight.

In a third preferred embodiment, a liquid crystalline coating solution according to the present invention has a pH of 4 to 10.

In a fourth preferred embodiment, a polarizing film according to the present invention is obtained by casting the liquid crystalline coating solution into a thin film state.

ADVANTAGE OF THE INVENTION

The present invention provides a liquid crystalline coating solution having a maximum absorption wavelength at a wavelength of 520 to 600 nm with high visibility and a polarizing film exhibiting large absorption dichroism.

DESCRIPTION OF THE PREFERRED EMBODIMENTS

Liquid Crystalline Coating Solution

A liquid crystalline coating solution of the present invention comprises: an azo compound represented by a specific general formula; and a solvent to dissolve the azo compound. The liquid crystalline coating solution of the present invention has a maximum absorption wavelength in the region where visibility is high. The maximum absorption wavelength of the liquid crystalline coating solution of the present invention is preferably in the range of 520 to 600 nm, more preferably in the range of 530 to 580 nm.

In the liquid crystalline coating solution of the present invention, the aforementioned azo compound forms supramolecular aggregates in the solution and exhibits a liquid crystal phase. The liquid crystal phase is not particularly limited, but examples of the liquid crystal phase include a nematic liquid crystal phase, a hexagonal liquid phase or the like.

The aforementioned azo compound in the liquid crystalline coating solution of the present invention preferably has a concentration of 0.5 to 50% by weight. A liquid crystalline coating solution exhibiting a stable liquid crystal phase can be obtained because the concentration of the azo compound is within the aforementioned range and a polarizing film with a desired thickness (For example, 0.4 µm) can be easily obtained. In the liquid crystalline coating solution of the present invention, the concentration of the aforementioned azo compound preferably exhibits a liquid crystal phase at least at a portion of the aforementioned range. The aforementioned liquid crystalline coating solution preferably has a pH of 4 to 10. A polarizing film with high orientation degree can be obtained when the pH is in the above-mentioned range. And the liquid crystalline coating solution is superior in productivity because the coating solution does not cause a coater made of a metal, such as stainless steel to corrode.

The coating solution of the present invention may contain anything including the aforementioned specific azo compound and a solvent, for instance, the coating solution of the present invention may contain other liquid crystal compound or any additives. Examples of the additives include a surfactant, an antioxidant, an antistatic agent and the like. The concentration of the additives is generally less than 10% by weight.

While the method for preparing the liquid crystalline coating solution is not particularly limited, the aforementioned azo compound may be added to the solvent, alternatively, the solvent may be added to the aforementioned azo compound.

[Azo Compound]

The azo compound to be used for the coating solution of the present invention is represented by the following general formula (I):

[Chemical formula 1]

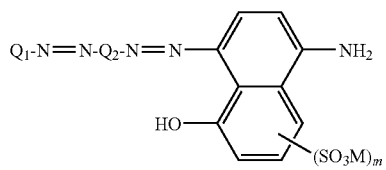

(I)

wherein $Q_1$ is a phenyl group or a naphthyl group (these groups may have any substituent groups); $Q_2$ is a phenylene group or a naphthylene group (these groups may have any substituent groups); m is an integer from 1 to 5; M is a counter ion.

The azo compound represented by the general formula (I) does not have a hydroxyl group at an ortho position toward an azo bond of a naphthalene ring, so that the azo compound does not form a hydrazone form. That enables to prevent the maximum absorption wavelength from being a long wavelength. As a result, an azo compound having a maximum absorption wavelength in the wavelength range of 520 nm to 600 nm with high visibility.

In accordance with a method in "Riron Seizo Senryo Kagaku Volume No. 5 (Theoretical Production Dye Chemistry Volume No. 5," Yutaka Hosoda (published on Jul. 15, 1968, Gihodo Shuppan Co., Ltd.) pages 135 to 152), a monoazo compound is produced by diazotizing and coupling two kinds of compounds having an amino group and the obtained monoazo compound is subject to diazotization and coupling reaction with 6-amino-4-hydroxynaphthalene sulfonic acid derivative to obtain an azo compound represented by the general formula (I). In $Q_1$ and $Q_2$ in the general formula (I), a substituent group is respectively selected appropriately to adjust the width of the absorption wavelength.

An aniline derivative and an aminophthalene derivative are preferably used as a compound with the aforementioned amino group. Examples of the aforementioned aniline derivative include (o-; m-; p-)fluoroaniline, (o-; m-; p-)nitroaniline, (o-; m-; p-)cyanoaniline, (o-; m-; p-)methylaniline, (o-; m-; p-) methoxyaniline, (o-; m-; p-)ethoxyaniline or the like. Examples of the aforementioned aminonaphthalene derivative include 1-aminonaphthalene, 2-aminonaphthalene, 8-amino-2-naphthalene sulfonic acid or the like.

The aforementioned azo compound is preferably represented by the following general formula (II). In the formula (II), X and Y are individually a halogen atom, a nitro group, a cyano group, an alkyl group having 1 to 4 carbon numbers, an alkoxy group having 1 to 4 carbon numbers, or —$SO_3M$ group, m is an integer from 1 to 5, and M is a counter ion. The azo compound represented by the general formula (II) has a maximum absorption wavelength in the wavelength range having high visibility, and is soluble in water, so that a stable liquid crystal phase is formed in the solution.

[Chemical formula 2]

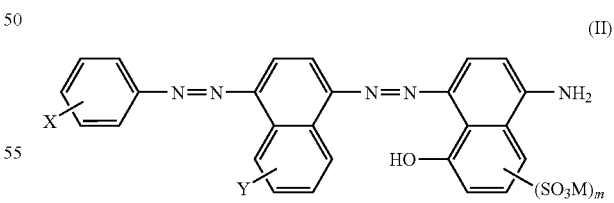

(II)

For instance, a monoazo compound is produced by diazotizing and coupling an aniline derivative and 8-amino-2-naphthalene sulfonic acid in accordance with a conventional method and the obtained monoazo compound is subject to diazotization and coupling reaction with 6-amino-4-hydroxynaphthalene sulfonic acid derivative to obtain an azo compound represented by the general formula (II).

Examples of the counter ion M in the aforementioned general formulae (I) and (II) preferably include a hydrogen atom, an alkali metal atom, an alkali earth metal atom, a metal ion or a substituted or unsubstituted ammonium ion. Examples of a metal ion include, for instance, $Na^+$, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Mn^{2+}$, or $Ce^{3+}$ and the like. When the counter ion M is a multivalent ion, a plurality of azo compounds share one multivalent ion (counter ion).

[Solvent]

Solvents to be used in the present invention dissolve the aforementioned azo compounds and hydrophilic solvents are preferably used as the solvents. The aforementioned hydrophilic solvents are preferably water, alcohol kinds, cellsolve kinds and mixture of thereof. Water-soluble compounds, such as glycerin, ethyleneglycol or the like may be added to the solvents. These additives can be used to control readily solubility and the drying rate of the coating solution.

[Polarizing Film]

A polarizing film of the present invention can be obtained by casting the aforementioned liquid crystalline coating solution. The polarizing film of the present invention exhibits absorption dichroism in a wavelength range with high visibility (at a wavelength of 520 to 600 nm). Such characteristics are obtained by the orientation of the aforementioned azo compound in the polarizing film. The aforementioned azo compound can be oriented by flowing when applying shearing force in a liquid crystal state. The aforementioned azo compound forms supramolecular aggregates in the liquid crystalline coating solution. Accordingly, the long axis direction of the supramolecular aggregates is oriented in the flowing direction by applying shearing force to the coating solution including this to flow. In addition to sharing force, an orientation means may combine orientation treatment, such as rubbing treatment and optical orientation or the like and orientation by a magnetic field and an electric field. The polarizing film of the present invention preferably has a thickness of 0.1 to 3 μm. The dichroic ratio of the polarizing film of the present invention is preferably 3 or more.

[Flow Casting]

While it is to be understood that the flow casting means of a liquid crystalline coating solution is not particularly limited, if only the coating solution is uniformly cast, a flow casting means using an appropriate coater is applied. Cast flowing apparatuses to be used include a slide coater, a slot die coater, a bar coater, a rod coater, a roll coater, a curtain coater, and a spray coater or the like.

[Substrate]

While it is to be understood that a substrate for casting the liquid crystalline coating solution is not particularly limited, a single layer or a plurality of laminates (for example, including an orientation film) may be used. Examples of the specific substrate include a glass plate and a resin film. When the substrate includes an orientation film, the orientation film is preferably treated with orientation. Examples of the substrate including an orientation film include a substrate made by coating a polyimide film on a glass plate. Orientation property is given to the polyimide film by a known method, for example, by mechanical orientation treatment, such as rubbing or the like and optical orientation treatment or the like. An alkali-free glass to be used for a liquid crystal cell is preferably used as a substrate glass. A resin film substrate is preferably used for the uses that require flexibility. The surface of the resin film may be orientation treated by rubbing or the like. Alternatively, an orientation film composed of other materials may be formed on the surface of the resin film. While materials of the resin film used for the substrate are not particularly limited, only if the materials are resins having film forming properties, examples of the materials include stylene resin, (meta) acrylic acid resin, polyester resin, polyolefin resin, norbornen resin, polyimide resin, cellulose resin, polyvinyl alcohol resin, and polycarbonate resin or the like. Although the thickness of the substrate is not particularly limited except for its application, the thickness is generally in the range between 1 to 1,000 μm.

[Drying]

A liquid crystalline coating solution which has been cast may be dried, if necessary. While the drying means is not particularly limited, natural drying, reduced-pressure drying, drying by heating, and drying by heating under reduced pressure or the like may be used. Any drying methods using a drying apparatus, such as an air circulation-type drying oven or heated rolls and the like are used as drying by a heating means. The drying temperature in the case of drying by heating is preferably 50 to 120° C.

[Applications of Polarizing Film]

The polarizing film of the present invention is preferably used as a polarizer. The polarizer is applied to liquid crystal display apparatuses, such as office automation appliances, such as personal computer monitors, laptop computers, copy machines or the like, portable devices, such as mobile phones, watches, digital cameras, Personal Digital Assistance (PDA), portable game devices or the like, home appliances, such as video cameras, television units, and microwave oven or the like, car appliances, such as rear-view mirrors, monitors for car navigation system, and car audio videos or the like, displays, such as monitors for information for stores, and security gizmos, such as supervisory monitors, care giving monitors, and monitors for medical purposes or the like. The polarizing film of the present invention may be used after being released from the substrate or may be used in the state that the polarizing film is limited on the substrate. When the polarizing film is used for an optical application while the polarizing film is laminated on the substrate, the substrate is preferably transparent to visible light. The polarizing film may be used in the state of being laminated on other support or an optical element when the polarizing film is released from the substrate.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-fluoroaniline and 8-amino-2-naphthalene sulfonic acid. The obtained monoazo compound was diazotized by a conventional method in the same manner and was further subject to diazotization and coupling reaction with 8-amino-4-hydroxy-2-naphthalene sulfonic acid to obtain a rough product including an azo compound having the following structural formula (III) and salting out was carried out with sodium chloride to obtain an azo compound having the following structural formula (III):

[Chemical formula 3]

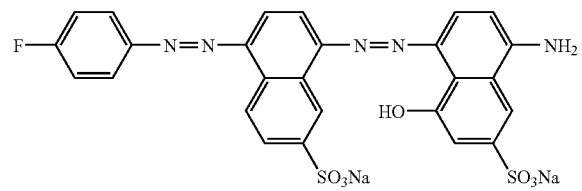

(III)

The azo compound of the aforementioned structural formula (III) was dissolved in ion-exchange water to prepare a coating solution of 1.8% by weight. The coating solution had a pH of 6.7. The coating solution was obtained with a poly dropper and was sandwiched by two pieces of slide glasses. A nematic liquid crystal phase was observed when observing using a polarizing microscope at room temperature (23° C.).

The aforementioned coating solution was cast by flowing on the surface of a norbornene polymer film (produced by Nippon Zeon Co., Ltd., product name "Zeonor") with rubbing treatment and corona treatment in a thin film state using a bar coater (produced by BUSCHMAN, product name "Mayerrot HS4") to obtain a polarizing film by natural drying in a temperature-controlled room at 23° C. The maximum absorption wavelength of transmission spectrum ($k_2$) of the obtained polarizing film was 560 nm and the dichroic ratio was 5.3 at a wavelength of 560 nm.

Example 2

The azo compound having the following structural formula (IV) was obtained in the same manner as in Example 1 except for changing 4-fluoroaniline to 4-nitroaniline and changing sodium chloride to lithium chloride.

[Chemical formula 4]

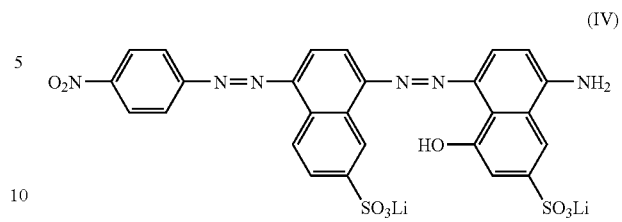

(IV)

The azo compound of the aforementioned structural formula (IV) was dissolved in ion-exchange water to prepare a coating solution of 5.0% by weight. The coating solution had a pH of 9.1. The coating solution was obtained with a poly dropper and was sandwiched by two pieces of slide glasses. A nematic liquid crystal phase was observed when observing using a polarizing microscope at room temperature (23° C.).

A polarizing film was prepared in the same manner as in Example 1 except for using the aforementioned coating solution. The maximum absorption wavelength of transmittance spectrum ($k_2$) of this polarizing film was 595 nm. The dichroic ratio of the aforementioned polarizing film was 3.6 at a wavelength of 595 nm.

Comparative Example

In accordance with a conventional method, a monoazo compound was obtained by diazotizing and coupling p-anisidine and 8-amino-2-naphthalene sulfonic acid. The obtained monoazo compound was diazotized by a conventional method in the same manner and was further subject to coupling reaction with 7-amino-1-naphthol 3,6-disulfonate lithium salt to obtain a rough product including an azo compound having the following structural formula (V) and salting out was carried out with sodium chloride to obtain an azo compound having the following structural formula (V):

[Chemical formula 5]

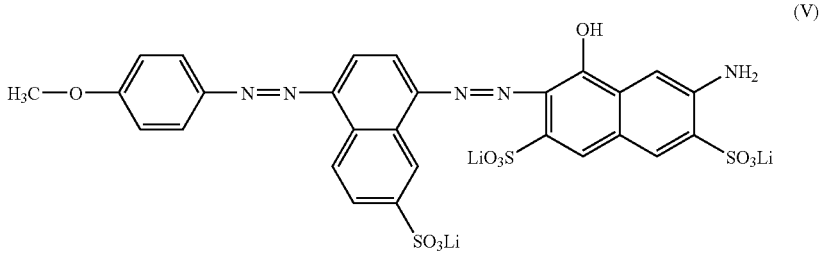

(V)

The azo compound having the aforementioned structural formula (V) was dissolved in ion-exchange water to adjust a coating solution exhibiting a nematic liquid crystal phase of 17.9% by weight. A polarizing film in Comparative Example was prepared in the same manner as in Examples 1 and 2 using the aforementioned coating solution. The maximum absorption wavelength of the transmission spectrum ($k_2$) of the polarizing film in the Comparative Example was 615 nm.
[Measurement Method]
[Measurement Method of pH]

The pH value of the coating solution was measured using a pH meter (produced by DENVER INSTRUMENT, product name: "Ultra BASIC").

[Observation of Liquid Crystal Phase]

The coating solution was obtained using a poly dropper and was sandwiched by two pieces of slide glasses (produced by Matsunami Glass Ind. Ltd., product name: "MATSUNAMI SLIDE GLASS") to observe using a polarization microscope (manufactured by Olympus, product name: "OPTIPHOT-POL").

[Maximum Absorption Wavelength of Polarizing Film and Calculation of Dichroic Ratio]

Polarization transmission spectra $k_1$ and $k_2$ were measured using a spectrophotometer (produced by JASCO Corporation, product name: V-7100). $k_1$ is a transmission spectrum when incident on polarization having an electric field vector parallel to a transmission axis of the polarizing film. $k_2$ is a transmission spectrum when incident on polarization having an electric field vector perpendicular to a transmission axis of the polarizing film. The measured wavelength was in the range of 380 to 780 nm. The dichroic ratio of the polarizing film was calculated by an equation: $\log(1/k_2)/\log(1/k_1)$.

There have thus been shown and described a novel liquid crystalline coating solution and a novel polarizing film, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A liquid crystalline coating solution comprising:
   an azo compound represented by the following general formula (I); and
   a solvent to dissolve the azo compound:

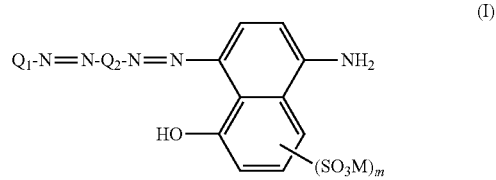

wherein $Q_1$ is a group selected from the group consisting of a substituted or unsubstituted phenyl group and a substituted or unsubstituted naphthyl group; $Q_2$ is a group selected from the group consisting of a substituted or unsubstituted phenylene group and a substituted or unsubstituted naphthylene group; m is an integer from 1 to 5; and M is a counter ion.

2. The liquid crystalline coating solution according to claim 1, wherein the azo compound has a concentration of 0.5 to 50% by weight.

3. The liquid crystalline coating solution according to claim 1, wherein the liquid crystalline coating solution has a pH of 4 to 10.

4. A polarizing film obtained by casting the liquid crystalline coating solution according to claim 1 in a thin film state.

* * * * *